(12) United States Patent
Brown et al.

(10) Patent No.: US 9,848,017 B2
(45) Date of Patent: Dec. 19, 2017

(54) TECHNIQUES FOR IDENTITY AND POLICY BASED ROUTING

(71) Applicant: Micro Focus Software Inc., Provo, UT (US)

(72) Inventors: Jeremy Ray Brown, Bluffdale, UT (US); Jason Allen Sabin, Lehi, UT (US); Nathaniel Brent Kranendonk, Springville, UT (US); Kal A. Larsen, Springville, UT (US); Lloyd Leon Burch, Payson, UT (US); Stephen R Carter, Spanish Fork, UT (US)

(73) Assignee: Micro Focus Software Inc., Provo, UT (US)

( * ) Notice: Subject to any disclaimer, the term of this patent is extended or adjusted under 35 U.S.C. 154(b) by 0 days.

(21) Appl. No.: 14/609,722

(22) Filed: Jan. 30, 2015

(65) Prior Publication Data

US 2015/0143458 A1    May 21, 2015

Related U.S. Application Data

(63) Continuation of application No. 13/905,308, filed on May 30, 2013, now Pat. No. 8,977,775, which is a (Continued)

(51) Int. Cl.
| | | |
|---|---|---|
| *G06F 15/177* | (2006.01) | |
| *H04L 29/06* | (2006.01) | |
| *H04L 12/24* | (2006.01) | |
| *H04L 12/46* | (2006.01) | |
| *H04L 12/18* | (2006.01) | |
| *H04L 12/707* | (2013.01) | |
| *G06F 9/50* | (2006.01) | |
| *H04L 12/725* | (2013.01) | |
| *G06F 21/60* | (2013.01) | |
| *H04L 12/721* | (2013.01) | |

(52) U.S. Cl.
CPC ............ *H04L 63/20* (2013.01); *G06F 9/50* (2013.01); *G06F 21/606* (2013.01); *H04L 12/18* (2013.01); *H04L 12/4641* (2013.01); *H04L 41/0816* (2013.01); *H04L 45/14* (2013.01); *H04L 45/24* (2013.01); *H04L 45/302* (2013.01)

(58) Field of Classification Search
CPC . H04L 41/0816; H04L 45/24; H04L 12/4641; H04L 12/18
USPC ................... 718/1; 370/390, 338; 726/1, 15
See application file for complete search history.

(56) References Cited

U.S. PATENT DOCUMENTS 6,484,092 B2   11/2002   Seibel
6,977,890 B2   12/2005   Oohashi et al.
(Continued)

OTHER PUBLICATIONS

U.S. Appl. No. 12/869,506, Non Final Office Action dated Sep. 21, 2012, 18 pgs.
(Continued)

*Primary Examiner* — Kyung H Shin
(74) *Attorney, Agent, or Firm* — Schwegman Lundberg & Woessner, P.A.

(57) ABSTRACT

Techniques for identity and policy based routing are presented. A resource is initiated on a device with a resource identity and role assignments along with policies are obtained for the resource. A customized network is created for the resource using a device address for the device, the resource identity, the role assignments, and the policies.

20 Claims, 4 Drawing Sheets

Related U.S. Application Data continuation of application No. 12/869,506, filed on Aug. 26, 2010, now Pat. No. 8,468,268.

(56) References Cited

U.S. PATENT DOCUMENTS

| | | | |
|---|---|---|---|
| 7,529,239 | B2 | 5/2009 | Seppanen |
| 7,570,628 | B2 | 8/2009 | Rangarajan et al. |
| 7,764,678 | B2 | 7/2010 | Johnson et al. |
| 7,779,065 | B2 | 8/2010 | Gupta et al. |
| 8,176,490 | B1 | 5/2012 | Jackson |
| 8,468,268 | B2 | 6/2013 | Brown et al. |
| 8,995,301 | B1* | 3/2015 | Miller ............ H04L 45/121 370/254 |
| 2006/0258341 | A1 | 11/2006 | Miller et al. |
| 2008/0301801 | A1* | 12/2008 | Jothimani ........ H04L 12/4641 726/15 |
| 2009/0019164 | A1 | 1/2009 | Brown et al. |
| 2009/0201899 | A1* | 8/2009 | Liu .................. H04L 45/24 370/338 |
| 2010/0329252 | A1* | 12/2010 | Mulamalla ........ H04L 12/18 370/390 |
| 2011/0093849 | A1* | 4/2011 | Chawla ............ H04L 41/0816 718/1 |
| 2012/0054368 | A1 | 3/2012 | Brown et al. |
| 2013/0263213 | A1 | 10/2013 | Brown et al. |

OTHER PUBLICATIONS

U.S. Appl. No. 12/869,506, Response filed Dec. 20, 2012 to Non Final Office Action dated Sep. 21, 2012, 8 pgs.
U.S. Appl. No. 12/869,506, Final Office Action dated Jan. 10, 2013, 21 pgs.
U.S. Appl. No. 12/869,506, Response filed Mar. 11, 2013 to Final Office Action dated Jan. 10, 2013, 10 pgs.
U.S. Appl. No. 12/869,506, Advisory Action dated Mar. 21, 2013, 3 pgs.
U.S. Appl. No. 12/869,506, Notice of Allowance dated Apr. 22, 2013, 6 pgs.
U.S. Appl. No. 13/905,308, Preliminary Amendment filed May 31, 2013, 5 pgs.
U.S. Appl. No. 13/905,308, Non Final Office Action dated Jul. 17, 2014, 20 pgs.
U.S. Appl. No. 13/905,308, Response filed Oct. 17, 2014 to Non Final Office Action dated Jul. 17, 2014, 9 pgs.
U.S. Appl. No. 13/905,308, Notice of Allowance dated Oct. 29, 2014, 8 pgs.

* cited by examiner

TECHNIQUES FOR IDENTITY AND POLICY BASED ROUTING

RELATED APPLICATION

This application is a continuation of U.S. patent application Ser. No. 13/905,308, filed on May 30, 2013, now issued as U.S. Pat. No. 8,977,775, which is a continuation of U.S. patent application Ser. No. 12/869,506, filed on Aug. 26, 2010, now issued as U.S. Pat. No. 8,468,268, each which is incorporated herein by reference in its entirety.

BACKGROUND

Cloud computing is rapidly changing the Internet into a collection of clouds, which provide a variety of computing resources, storage resources, and, in the future, a variety of resources that are currently unimagined. This new level of virtualization has unbounded the physical and geographical limitations of traditional computing. However, existing networking technology still binds virtualization software to physical limitations because it is still largely based on physical devices and manual mechanisms.

The current networking technology of today is based upon static networks and Internet Protocol (IP) based routing. So, as companies move to the new technology of Intelligent Workload Management with transparency and flexibility in their environments the traditional IP networking model fails to meet their needs.

This is so because network routing has always been separate from the software services that rely on network routing for network connectivity. Traditional network routing is done independent of the software services and has less than adequate ability to verify software logic in terms of business intelligence.

For example, if there is a financial server, then that server should not be accessible to machines that are not verified with security mechanisms in the network. With traditional approaches, the financial server is manually configured for network routing; so, hopefully someone does not plug a wrong machine address into the wrong network routing table, such that the financial server is compromised by a machine or service not authorized to access the financial server.

SUMMARY

Techniques for identity and policy based routing are presented. More particularly, and in an embodiment, a method for identity and policy based routing is described. A workload is initiated on a first device and the workload is authenticated to an identity service to establish a workload identity. Next, access privileges, role assignments, and policies are set for the workload. The access privileges, the role assignments, and the policies are acquired from the identity service in response to the workload identity. Then, the workload is registered, via the workload identity, as a customized network; the customized network based on: the workload identity, the role assignments, and the policies. Finally, one or more network routes are built for the workload that identifies network access routes to other devices and/or other workloads on the customized network, and the one or more network routes are based on: the workload identity, the role assignments, and the policies.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

A "workload" as used herein refers to a special type of resource, such as a Virtual Machine (VM), an Operating System (OS), a cloud, a hardware device, an agent, and an application.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-4.

Figure 1:
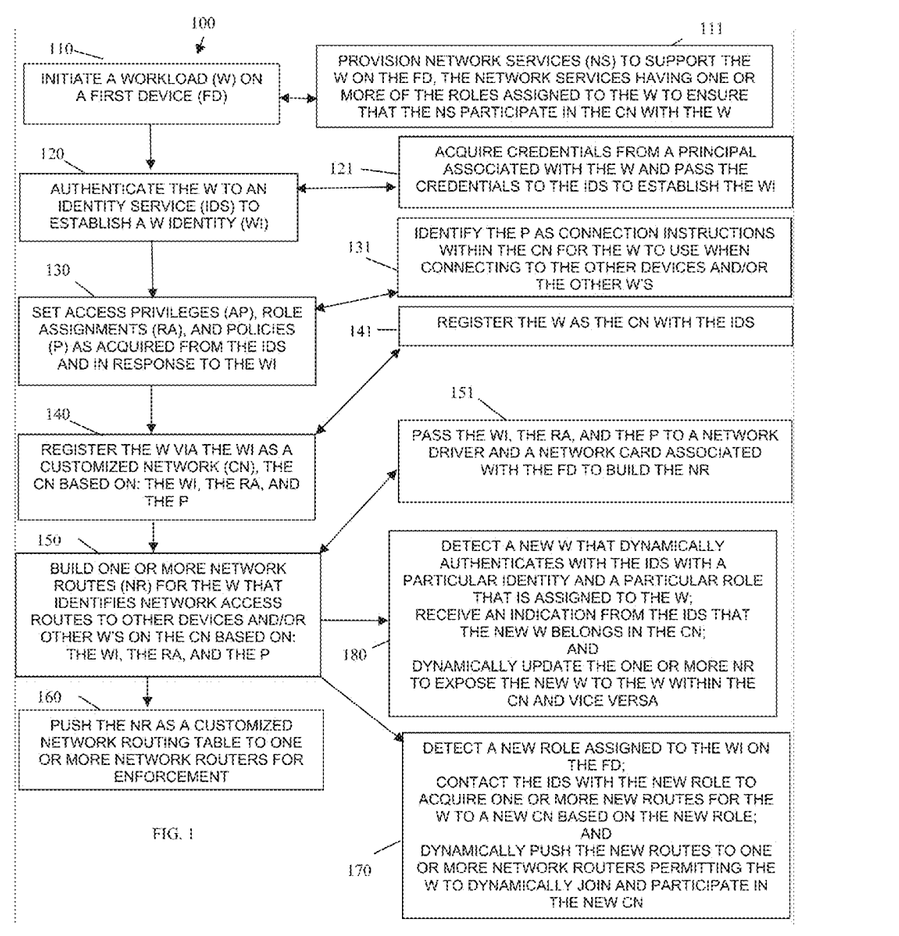
FIG. 1 is a diagram of a method for identity and policy based routing, according to an example embodiment.

FIG. 1 is a diagram of a method 100 for identity and policy based routing, according to an example embodiment. The method 100 (hereinafter "custom network routing service") is implemented in a machine-accessible and non-transitory computer-readable medium as instructions that execute on one or more processors (machines, computers, processors, etc.). The machines are specifically configured to process the custom network routing service. Furthermore, the custom network routing service is operational over and processes within a wide-area network (WAN). The WAN may be wired, wireless, or a combination of wired and wireless. In an embodiment, the WAN is the Internet.

At 110, the custom network routing service initiates a workload on a first device. Here, the first device is a processor-enabled device, such as a computer, a phone, a tablet, a personal digital assistant, and the like. The workload can be an OS, a cloud, a VM, an application, another software service, and the like. The custom network routing service configures and starts the workload on the first device.

According to an embodiment, at 111, the custom network routing service provisions network services for purposes of supporting the workload on the first device. These network services have one or more roles assigned to the workload that they share with the workload. This ensures that the network services participate in a custom network (mentioned below) with the workload. Some example network services can include, but are not limited to, a Domain Name System (DNS) service, a Dynamic Host Configuration Protocol service, a Network Time Protocol (NTP) service, and others.

At 120, the custom network routing service authenticates the workload on the first device. For security the workload itself is authenticated before normal operation of the workload is permitted on the first device. The workload is authenticated to an identity service (identity based and policy based authentication service) to establish a workload identity for the workload.

In an embodiment, at 121, the custom network routing service acquires credentials from a principal associated with the workload. These credentials are passed to the identity service for purposes of establishing the workload identity.

At 130, the custom network routing service sets access permissions, role assignments, and policies for the workload. The access permissions, role assignments, and policies are acquired from the identity service based on the workload identity and the authentication mentioned above with respect to the processing at 120.

It is again noted that the identity service manages and distributes the access permissions, the role assignments, and the policies.

In one scenario, at 131, the custom network routing service identifies the policies as connection instructions within a customized network (discussed below with reference to the processing at 140) for the workload to use when connecting to other devices and/or other workloads permitted to participate in the customized network. So, the manner of establishing connections can be defined in a number of the policies and the policies are acquired based on the workload identity.

At 140, the custom network routing service registers the workload (using the workload identity) as a customized network. The customized network is formulated based on the workload identity, the role assignments, and the policies. The customized network may be viewed as a virtual network or even a Virtual Private Network (VPN) and it defines all the other resources and/or devices (it is noted a device is a type of resource) that the workload can see and can access. It is also noted that at least initially, the customized network may just include the workload by itself on the first device; subsequent to this other workloads and/or devices can dynamically register and join in the customized network.

According to an embodiment, at 241, the custom network routing service registers the workload with the customized network via the identity services. That is, in one embodiment, the identity service may serve as a registration service or may facilitate the registration of the customized network for the custom network routing service.

At 150, the custom network routing service builds one or more network routes for the workload that identifies network access routes to other devices and/or other workloads on the customized network based on the workload identity, the role assignments, and the policies. The network routes combined with the policies permit the workload to contact and interface over a WAN (can also be a Local Area Network (LAN)) with the other devices and/or workloads. The connection protocols and services can be defined in the policies, which are customized for the role assignments and the workload identity.

According to an embodiment, at 151, the custom network routing service passes the workload identity, the role assignments, and the policies to a network driver and a network card associated with the first device to build the network routes. That is, existing network devices and network cards can be enhanced to build routes based on the policies and role assignments supplied by the identity service.

In one case, at 160, the custom network routing service pushes the network routes as a customized network routing table to one or more network routers for enforcement. So, existing routers require no modification and can use the routing tables supplied by the custom network routing service. Although in some instances, enhanced network routers may be used to recognize and enforce some policies that may be included, in some instances, in the network routing table.

In another scenario, at 170, the custom network routing service detects a new role assigned to the workload identity on the first device. Here, the workload may be dynamically based on policy evaluation and assume a new role that was previously not activated. In response to this situation, the custom network routing service contacts the identity service with the new role for purposes of acquiring one or more new routes for the workload to a new customized network based on the new role. Essentially, by changing to a previously inactive role, the workload dynamically joins a new customized network that is in operation; can cause creation of an entirely new customized network; so, activation of a previously inactive role may also create a new customized network. Next, the custom network routing service pushes the new routes to one or more network routers thereby permitting the workload to dynamically join and participate in the new customized network.

In still another situation, at 180, the custom network routing service detects a new workload that dynamically authenticates to the identity service with a particular identity and a particular role. In this case, the particular role is one that is already assigned to the workload. The custom network routing service receives an indication from the identity service that the new workload belongs in the customized network. So, the custom network routing service dynamically updates the one or more network routes to expose the new workload to the workload within the customized network and vice versa (to expose the workload to the new workload).

Figure 2:
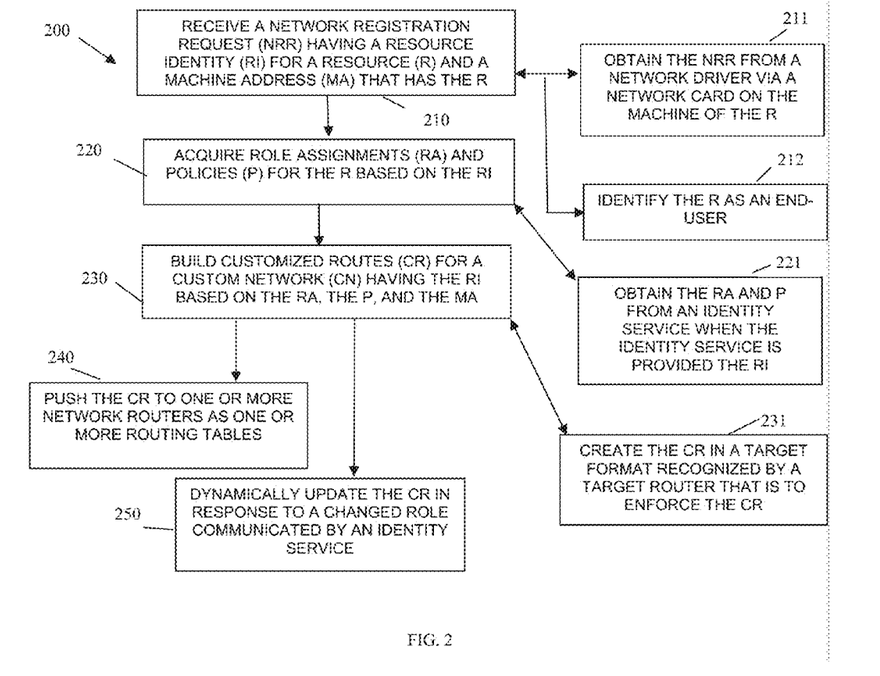
FIG. 2 is a diagram of another method for identity and policy based routing, according to an example embodiment.

FIG. 2 is a diagram of another method 200 for identity and policy based routing, according to an example embodiment. The method 100 (hereinafter "network registration service") is implemented in a machine-accessible and non-transitory computer-readable medium as instructions that execute on one or more processors (machines, computers, processors, etc.). The machine is specifically configured to process the network registration service. Furthermore, the network registration service is operational over and processes within a wide-area network (WAN). The WAN may be wired, wireless, or a combination of wired and wireless. In an embodiment, the WAN is the Internet.

The custom routing network service represented by the method 100 of the FIG. 1 is presented from the perspective of multiple components that provide custom network routing based on identity and policies. The network registration service is presented from the perspective one component, namely the registration component and route building component. In this sense, the network registration service expands upon one aspect of the custom routing network service described with respect to the method 100 of the FIG. 1.

At 210, the network registration service receives a network registration request, which includes a resource identity for a resource and a machine address that is executing or that has the resource. It is noted that the machine address may be for a VM where the resource operates or can be a set of addresses for a cloud environment where the resource is permitted to operate. The machine address can also be a traditional IP address for the processing device of the resource.

According to an embodiment, at 211, the network registration service obtains the network registration request from a network driver via a network card on the machine of the resource. This scenario was described above with reference to the processing at 151 of the FIG. 1 and is described below with reference to the FIG. 4.

In another situation, at 212, the network registration service identifies the resources as an end-user. So, the resource can be an actual end-user where routing is based on the identity of the user, roles assigned to the user, and policies assigned to the identity and roles.

At 220, the network registration service acquires role assignments and policies for the resource based on the resource identity.

In an embodiment, at 221, the network registration service obtains the role assignments and the policies from an identity service when the identity service is provided the resource identity and has either authenticated the resource or relies on an assertion that the resource is authenticated from a trusted relationship with the network registration service.

At 230, the network registration service builds customized routes for a customized network that includes the resource identity based on the role assignments, the policies, and the machine address for the resource (acquired at 210 above).

In one scenario, at 231, the network registration service creates the customized routes in a target format recognized by a target router that is to enforce the customized routes. Here, the network registration service generates the customized routes on demand in a format that can be processed by a target router for handling network traffic over the customized network.

In an embodiment, at 240, the network registration service pushes the customized routes to one or more network routers as one or more routing tables.

In another case, at 250, the network registration service dynamically updates the customized routes in response to a changed role communicated by an identity service. The customized routes can be modified, deleted, and reconstituted based on dynamic changing conditions as defined by the policies and based on the roles and identities of the resource and other resources.

Figure 3:
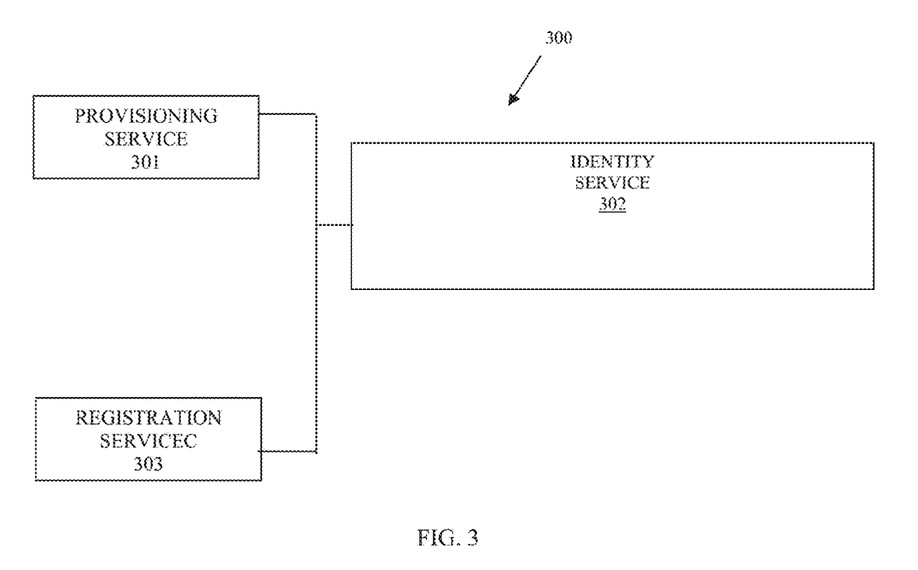
FIG. 3 is a diagram of an identity and policy based routing system, according to an example embodiment.

FIG. 3 is a diagram of an identity and policy based routing system 300, according to an example embodiment. The identity and policy based routing system 300 is implemented in a machine-accessible and non-transitory computer-readable medium as instructions that execute on multiple processors (machines, computers, processors, etc.). The machines are specifically configured to process the identity and policy based routing system 300. Furthermore, the identity and policy based routing system 300 is operational over and processes within a wide-area network (WAN). The WAN may be wired, wireless, or a combination of wired and wireless. In an embodiment, the WAN is the Internet.

In an embodiment, the identity and policy based routing system 300 implements, inter alia, the methods 100 and 200 of the FIGS. 1 and 2, respectively.

The identity and policy based routing system 300 includes a provisioning service 301, an identity service 302, and a registration service 303. Each of these components and their interactions with one another will now be described below in turn.

The provisioning service 301 is configured on and executes on one or more processors. The one or more processors are specifically configured to execute the provisioning service 301, which is executable instructions residing on one or more of the processors in a non-transitory computer or machine-readable storage format. Example processing associated with the provisioning service 301 was discussed above with reference to the method 100 of the FIG. 1.

The provisioning service 301 is configured to instantiate a resource on a first device. The resource can be a workload as discussed with reference to the FIG. 1 or can be any type of resource as defined above, including a user, a directory, a group of users, etc.

In an embodiment, the provisioning service 301 is also configured to initiate a network driver on the first device. The network driver participates in the customized network and securely communicates with the registration service 303 to initiate building the custom routes of the customized network.

In another case, the provisioning service 301 is configured to contact the identity service 302 for purposes of acquiring the resource identity for the resource, the role assignments for the resource identity, and policies to enforce against both the resource identity and the resource role assignments.

The identity service 302 is configured on and executes on one or more processors. The one or more processors are specifically configured to execute the identity service 302, which is executable instructions residing on one or more of the processors in a non-transitory computer or machine-readable storage format. Example processing associated with the identity service 302 was discussed above with reference to the methods 100 and 200 of the FIGS. 1 and 2, respectively.

The identity service 302 is configured to authenticate the resource and supply a resource identity along with role assignments and policies. The identity service 302 manages the resource identity and its association to role assignments and the policies that drive the role assignments and that may also define connection instructions for connection and participating in the customized network.

The registration service 303 is configured on and executes on one or more processors. The one or more processors are specifically configured to execute the registration service 303, which is executable instructions residing on one or more of the processors in a non-transitory computer or machine-readable storage format. Example processing associated with the registration service 303 was discussed above with reference to the methods 100 and 200 of the FIGS. 1 and 2, respectively.

The registration service 303 is configured to use the resource identity, the role assignments, and the policies to build custom routes for a custom network that the resource belongs to.

According to an embodiment, the registration service 303 is also configured to verify the resource identity, the role assignments, and the policies via the identity service 302. So, an additional check can be made to ensure no tampering has occurred. In other cases, the registration service 303 may independently acquire the role assignments and policies from the identity service 302 when building the custom network.

Figure 4:
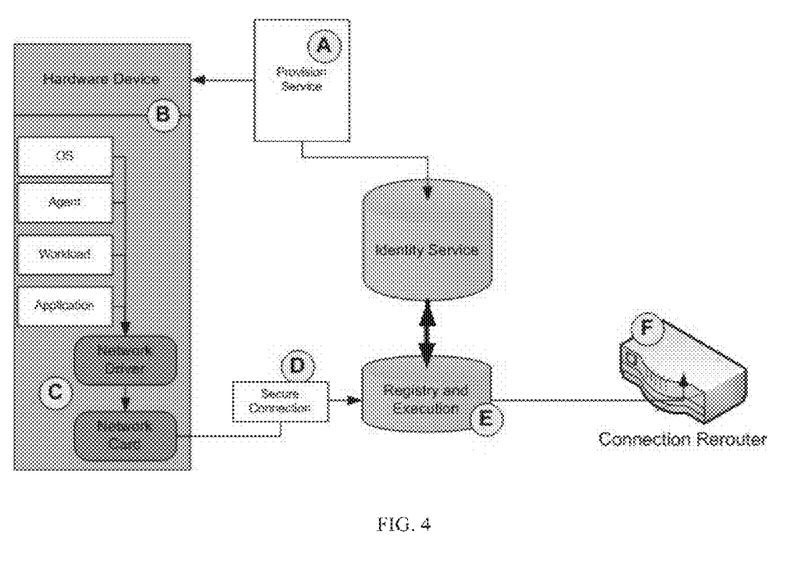
FIG. 4 depicts an example architecture for identity and policy based routing, according to an example embodiment.

FIG. 4 depicts an example architecture for identity and policy based routing, according to an example embodiment. It is noted that the architecture shown in the FIG. 4 is presented for purposes of illustration only as other components or less components can be used to realize the teachings presented herein. Therefore, the specific illustration of the FIG. 4 is not intended to limit the teachings in any manner.

Item A is an initial action for provisioning a resource (here a Hardware Device in the FIG. 4). With provisioning, the resource is either created or enabled to access services on its device. This provisioning has two components where they talk to the resource and to the identity service, which is where access/role/policies are built to handle the traffic.

Item B is where provisioning service is talking to the resource, which can reside in a number of different formats. It is noted that Item A is talking with B to give B permission or security to talk with Item E over a secure channel. This secure channel can be Secure Sockets Layer (SSL) or any other form of secure communication to allow Item D to talk.

Item C is focusing upon the communication between the driver/card to the registry for the re-router. In B, information is passed to make the secure connection correctly and to authenticate the connection.

Item D is the secure connection that allows connection to the network driver/network card of the device being used by the resource.

Item E shows that once connection to the registry has been made, then data associated with a Media Access Control (MAC) address/IP address/device address can be synchronized with the identity service data. Now the registry has worked correctly over a secure connection and data can be properly executed for routing within the customized network. This entails taking identity/role/policies and device data of IP address/MAC address/Device address and building a routing table for the customized network.

E (last action) takes the routing table and pushes it to the router at F, which will take the data and actually make connections between the boxes.

It is noted that routes between connection re-routers can be made as well.

The teachings herein permit controlling of networking access through identity and policies on the network level. Each resource is considered a network of one and the only access to anything is through the mechanism that builds the route individually based upon identity of the resource and policy of how the resource can connect. The techniques are controlling dynamically the access to resources instead of static connections that are not controlled through business logic. This is especially apparent in virtualization networks where one is at the mercy of the network configuration and one does not fully understand that connection.

The techniques presented can also be viewed from a different perspective (as discussed with the method 200 of the FIG. 2). The workload/resource connects through the network but also the users can be the resource. So, if one bases connections on what user is on the system, then the techniques permit building and destroying dynamic routes in the networks. As a user connects to a box (device) his/her account is given access to the machines for his/her roles. Once he/she disconnects then the routes are removed.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
creating a customized network with multiple customized routes based on a resource identity and identifying customized connection protocols and services associated with interfacing with the resource identity over the customized network and defining the customized network as the multiple customized routes between a resource associated with the resource identity and other resources for the resource to interface with the other resources over the customized network by using the customized connection protocols and services associated with the resource identity with the connection protocols and services customized based on role assignments and the resource identity;
providing access over the multiple customized routes for the resource to establish connections and to access the other resources over a network connection within the customized network; and
detecting when an inactive role assigned to the resource or at least one of the other resources is activated as a new active role for the resource or the at least one of the other resources and in response creating a new customized network with multiple new customized routes.

2. The method of claim 1, wherein creating further includes creating the customized network based on role assignments and policies.

3. The method of claim 1, wherein creating further includes creating the customized network as a Virtual Private Network (VPN).

4. The method of claim 3 further comprising, defining all devices and all additional resources that the resource can access when the resource access the VPN.

5. The method of claim 4, wherein creating further includes initially creating the customized network with just the resource and dynamically adding the other resources.

6. The method of claim 1, wherein providing further includes dynamically adding an additional resource to the customized network.

7. The method of claim 1, wherein providing further includes identifying the resource as a workload.

8. The method of claim 1, wherein providing further includes providing the multiple customized routes to one or more network routers as a routing table.

9. The method of claim 1 further comprising, detecting a new role assigned to the resource identity and updating the multiple customized routes based on the new role.

10. The method of claim 1 further comprising, provisioning network services to support the resource communicating over the customized network.

11. A method, comprising:
registering a machine executing a resource based on a machine identity and a resource identity;
establishing a custom network for the resource and identifying customized connection protocols and services associated with interfacing with the resource over the custom network, and defining within the custom network other resources and other devices that the resource can establish connections with and can access over the custom network through multiple customized routes generated for and defining the custom network by the resource using the customized connection protocols and services with the connection protocols and services customized based on role assignments and the resource identity; and detecting when an inactive role assigned to the resource, at least one of the other resources, or at least one of the devices is activated as a new active role for the resource, the at least one of the other resources, or the at least one of the devices, and in response creating a new customized network with multiple new customized routes.

12. The method of claim 11, wherein establishing further includes building the custom network based on role assignments and policies associated with the resource and the machine.

13. The method of claim 11, wherein establishing further includes establishing the custom network as a virtual network.

14. The method of claim 11, wherein establishing further includes dynamically adding an additional resource to the custom network.

15. The method of claim 11, wherein establishing further includes dynamically changing the multiple custom routes for the custom network based on a detected change in one of: a role assignment and a policy change.

16. The method of claim 11, wherein establishing further includes building the custom network as the multiple custom routes defined in a routing table.

17. The method of claim 16 further comprising, dynamically pushing the routing table to network routers.

18. The method of claim 17, wherein pushing further includes providing the routing table in formats recognized and processed by each of the network routers.

19. A system, comprising:

a hardware processor; and a non-transitory computer-readable storage medium having executable instructions representing a provision service, the provision service configured to:

i) execute on the hardware processor, ii) establish a custom network for a resource based on a resource identity of the resource and identify based on the resource identity customized connection protocols and services for interacting with the resource over the custom network, iii) dynamically add additional resources to the custom network and multiple custom routes through the custom network from the resource and the additional resources for connection with and for interaction over the custom network using the customized connection protocols and services with the connection protocols and services customized based on role assignments and the resource identity, and iv) detect when an inactive role assigned to the resource or at least one of the additional resources is activated as a new active role for the resource or the at least one of the additional resources and in response create a new customized network with multiple new customized routes, wherein the custom routes defining the custom network.

20. The system of claim 19, wherein the provision service is further configured, in ii), to:

build the custom network as a virtual network comprising the multiple custom routes.

* * * * *